Oct. 25, 1938.  V. EHLE  2,134,113
WATER PURIFICATION APPARATUS AND METHOD
Filed Feb. 8, 1935  2 Sheets-Sheet 1

Inventor
Virgil Ehle

By Philip E. Liggers
Attorney

Patented Oct. 25, 1938

2,134,113

UNITED STATES PATENT OFFICE 2,134,113

WATER PURIFICATION APPARATUS AND METHOD

Virgil Ehle, Gloversville, N. Y.

Application February 8, 1935, Serial No. 5,653

9 Claims. (Cl. 210—61)

This invention relates to apparatus for purifying water, sewage and trade wastes and also to methods for purifying liquids and liquid wastes and aims to provide an improved apparatus and method of the character mentioned. More specific objects of the invention will be pointed out in the following description of apparatus well adapted to purify certain trade wastes and constituting a preferred embodiment of the invention.

In the accompanying drawings forming a part of this specification,—

As is well known, sedimentation of matter suspended in a liquid proceeds under the law that the diameters of bodies which can be removed vary as the square of the velocity of the liquid while the weights of such bodies vary as the sixth power of the velocity. Therefore, the size of the particles deposited diminishes rapidly as the velocity of the water diminishes. This law applies only to particles of a certain size because particles which are extremely minute may be held in suspension by surface tension or skin friction. Very small particles may be removed from a liquid by any process which enhances colloidal action or adsorption. In a tank where the section is constant and the velocity the same throughout, the contacts between very small particles are more or less accidental. The ideal sedimentation tank is a basin in the form of an inverted cone with impure liquid entering the apex at the bottom and being taken off evenly over the top surface. In such an ideal tank particles of a definite size will reach a stage of equilibrium, remaining in a certain zone until other small particles on their way upward will attach themselves to the particles in said zone, thus forming a larger particle, which moves downwardly to a lower zone, this process being repeated indefinitely until relatively coarse particles are deposited at the bottom of the tank. The particles held in suspension form a dense screen which in addition to the colloidal action has a mechanical screening effect, resulting in a much higher removal of suspended solids than would take place because of adsorption alone.

In accordance with the invention, a tank or casing is provided having baffles which slope similarly to the sides of an inverted cone. The impure liquid is introduced at a point preferably near the apex of the cone and the liquid as it rises in the tank decreases in velocity and is taken off from the top of the first compartment and returned to the bottom of the next compartment which surrounds the compartment first mentioned. Preferably, and as shown, there are five or six compartments within a tank provided by a plurality of pairs of closely adjacent frusto-conical or frusto-conical and cylindrical surfaces. As the impure liquid passes between the closely adjacent surfaces adsorption is promoted and immediately afterward an opportunity is given to said particles to be deposited at the bottom of the next succeeding compartment; this process being repeated as often as necessary until the final liquid delivered at the top of the last compartment is sufficiently clear. The number of compartments is determined by the amount and rate of flow of the liquid under treatment.

Figure 1:
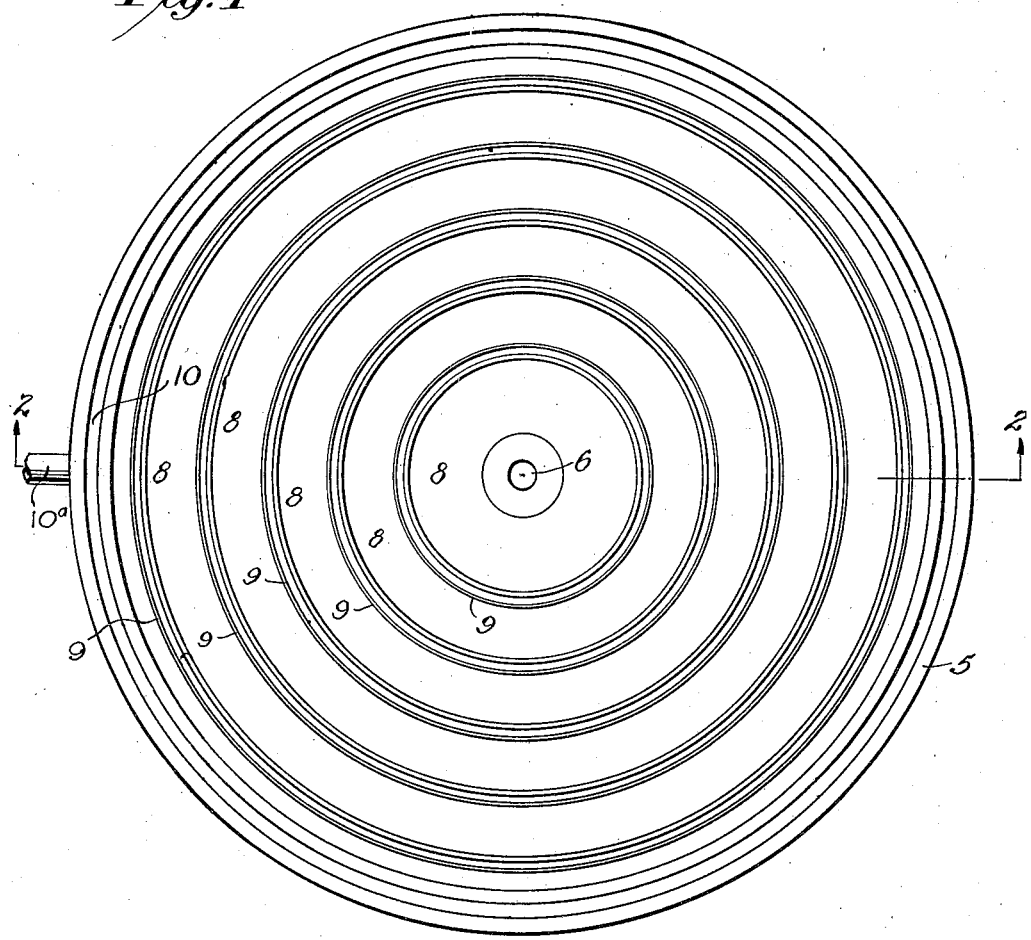
Fig. 1 is a top plan view of the apparatus showing the top of the casing removed.
Figure 2:
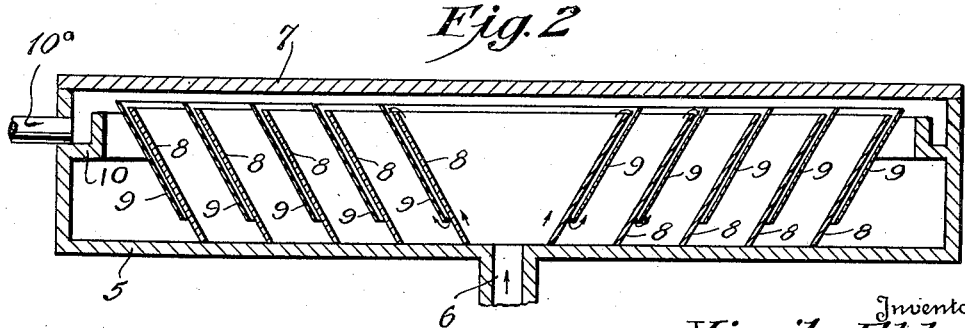
Fig. 2 is a section on line 2—2 of Fig. 1.

Referring particularly to the drawings, and first to Figs. 1 and 2, there is shown a tank 5, which is preferably in the form of a relatively shallow cylinder, but which may be square or have other shapes. The tank 5 has a bottom which is normally completely closed except at the inlet 6, which is preferably a pipe of relatively large diameter leading into the center of the tank 5 at the bottom thereof. A cover 7 is shown as closing the top of the tank or casing; however in treating some liquids, a cover will not be used. See Fig. 4.

Figure 3:
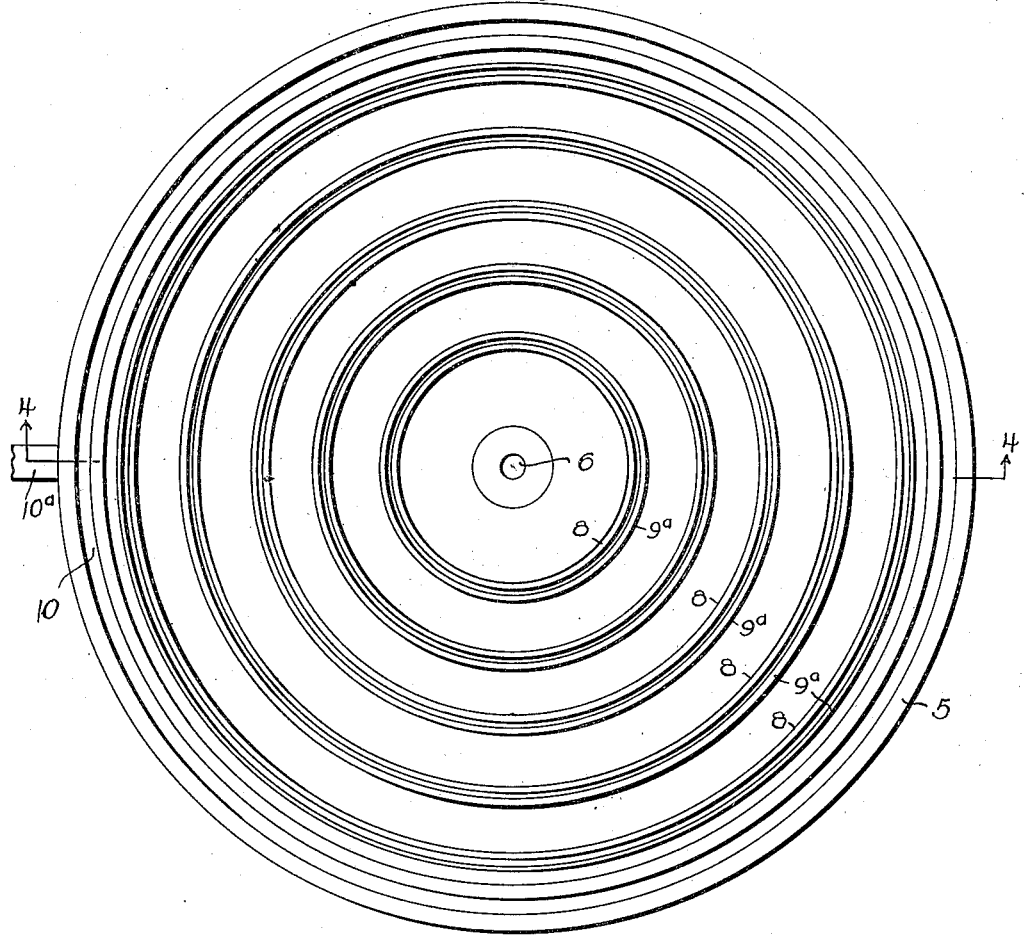
Fig. 3 is a top plan of a modification, wherein a different arrangement of baffles is used and the apparatus has no cover.
Figure 4:
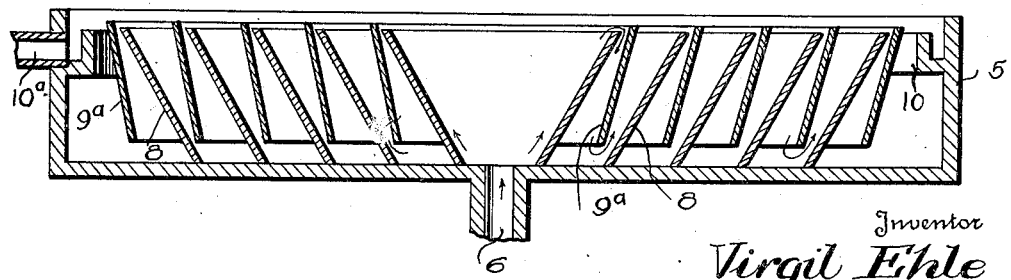
Fig. 4 is a section on line 4—4 of Fig. 3.

Located wholly within the casing are one or more pairs of frusto-conical surfaces preferably co-axial with the inlet pipe 6. Each of the inner frusto-conical walls 8 has its lower smaller end resting on the bottom of the tank 5, said bottom preferably being a plane surface. Preferably the frusto-conical walls 8 are of progressively increasing diameters so that the distance between any two adjacent walls 8 is the same as the distance between any other adjacent pair of said walls. Thus a series of compartments is formed within the casing, said compartments being of the same width but of progressively increasing areas. The upper larger ends of the several walls 8 are spaced below the top of the tank so that liquid may pass over the upper edges and down into a relatively restricted space provided by each of the walls 8 and a companion outer frusto-conical wall 9. Each of the outer walls 9 is preferably of the same slope as the companion inner wall 8 and in most cases said slope should be approximately sixty degrees, although the slope of the walls will be varied in treating different wastes. As shown, each outer wall 9 has its lower and smaller end spaced well above the bottom of the casing or tank and preferably its upper larger end is spaced somewhat above the upper edge of the corresponding wall 8. However, if it is desired to avoid increasing the velocity of the liquid, each outer wall 9a may be nearly cylindrical, as is shown in Figs. 3 and 4. Each wall 9 is preferably supported on the corresponding wall 8 as by tie-bolts (not shown) or other mechanical connections.

From the foregoing it will be clear that when the liquid wastes enter the compartment provided by the innermost wall 8, their velocity will be decreased as they rise in the tank and finally the wastes will overflow at the top edge of the innermost wall 8, passing downwardly between the walls 8 and 9 (or 9a) and into the next compartment, as indicated by the arrows. In the second compartment sedimentation will take place partly because of the lowered velocity of the liquid and partly because adsorption is promoted by passage of the liquid bearing said particles through the closely assembled particles held in equilibrium. The partly purified liquid will rise in the second compartment, further losing its velocity until it reaches the top of said compartment and then spills over the edge of baffle plate 8, moving downwardly between the walls 8 and 9 (or 9a) until it reaches the bottom of the third compartment, when further sedimentation takes place; and the process is repeated until the last compartment is reached outside of the last pair of walls 8, 9, 9a. Here the velocity is least and settling of the very finest particles will take place. Ultimately, the relatively pure liquid reaches the top of the last compartment and passes off over the overflow weir 10, which extends around the periphery of the tank and is led to the outlet pipe conducting the liquid to any point desired.

It will be clear that sediment and sludge will collect in the bottoms of each of the compartments, the coarsest particles being deposited first. Hence it will be necessary from time to time to clean out the tank and this may be done either by removing the lid 7 and working from above or by working through openings (not shown) in the bottom of the tank and located between the baffles 8.

The above described apparatus has been found particularly useful in purifying trade wastes, thus permitting the purified water to pass to a sewer or to a stream or even to a pond to be used again. In the event that sewage is to be purified, the spacing of the baffle plates relative to the bottom of the tank will be different, the casing will be open to the air, and a scum baffle would have to be employed. The principle, however, is the same whether sewage or trade wastes are to be removed from the water. In actual practice the described apparatus has been found to be extremely useful and effective and results in the delivery of relatively pure water to the outlet. The purification effect is as great as though a very tall inverted cone were used and yet the size of the apparatus is kept within practical limits, while an inverted cone of the proper size to effect the same purification would be prohibitively costly to build.

Obviously the present invention may be embodied in various forms of apparatus neither shown nor described. For example, a simple form embodying the invention will employ only a single pair of closely spaced frusto-conical walls within the casing. Many other modifications may be resorted to in practice.

Having described one embodiment of my invention, what I claim as new and desire to secure by Letters Patent is:

1. Apparatus of the character described comprising, in combination, a relatively shallow casing; an inlet provided in the bottom of the casing; a frusto-conical wall whose axis substantially coincides with the inlet and which is located wholly within the casing with its smaller end in contact with the bottom of the casing; a second frusto-conical wall surrounding the first and spaced above the bottom of the casing; and an outlet provided in the casing near the top thereof.

2. Apparatus of the character described comprising, in combination, a relatively shallow closed casing; an inlet provided in the bottom of the casing substantially at its center; a frusto-conical wall whose axis substantially coincides with the inlet and which is located wholly within the casing with its smaller end in contact with the bottom of the casing; a second frusto-conical wall surrounding the first and spaced above the bottom of the casing and also extending above the top of the first frusto-conical wall; and an outlet provided in the casing near the top thereof.

3. Apparatus of the character described comprising, in combination, a closed casing having an inlet; a plurality of pairs of frusto-conical baffles co-axial with said inlet and located wholly within the casing; each of said pairs comprising an inner baffle whose lower smaller end is in contact with the bottom of the casing and an outer baffle closely adjacent the inner one, said outer baffle having its lower smaller end spaced above the bottom of the casing; and an outlet in the casing at about the level of the top ends of said baffles.

4. Apparatus of the character described comprising, in combination, a closed casing having an inlet; a plurality of pairs of frusto-conical baffles located wholly within the casing; each of said pairs of baffles comprising an inner baffle whose lower smaller end is in contact with the bottom of the casing and an outer baffle closely adjacent the inner one, both baffles being of the same slope so that the space between them is of uniform width, said outer baffle having its lower smaller end spaced above the bottom of the casing; and an outlet in the casing near the top.

5. Apparatus of the character described comprising, in combination, a closed casing having an inlet in its bottom; a plurality of pairs of frusto-conical baffles co-axial with said inlet and located wholly within the casing; each of said pairs comprising an inner baffle whose lower smaller end is in contact with the bottom of the casing and an outer baffle closely adjacent the inner one, said outer baffle having its lower smaller end spaced above the bottom of the casing; said inner baffle having its upper end below the top of the casing and also below the upper end of the outer baffle, which is also spaced from the casing; and an outlet in the side walls of the casing near the top.

6. Apparatus of the character described comprising, in combination, a closed casing having an inlet; a plurality of pairs of baffles located wholly within the casing; each of said pairs of baffles comprising an inner baffle which is frusto-conical and whose lower smaller end is in contact with the bottom of the casing, and an outer baffle adjacent the inner one, but with its lower end spaced above the bottom of the casing and also spaced farther from the adjacent inner baffle than at the top; and an outlet for the purified liquid.

7. A method of purifying liquids containing solid particles comprising the following steps: first flowing the impure liquid into the lower portion of a confined space and upwardly with gradually decreasing velocity until it reaches the top of said confined space; flowing said liquid radially outwardly at the top of said confined space and downwardly to the bottom of another confined space of much larger cross-sectional area than the first mentioned confined space, measured in the same horizontal plane; then flowing the liquid upwardly in the second mentioned confined space with gradually decreasing velocity all the way to the top of the second mentioned confined space; and conducting the purified liquid away, leaving the solids settled out of the liquid in the bottoms of said confined spaces.

8. A method of purifying liquids according to claim 7, wherein the liquid as it passes from the top of one confined space to the bottom of another confined space outside the first named confined space is brought between two closely adjacent surfaces and is thereby guided and directed to the desired inner portion of the bottom of said other confined space.

9. A method according to claim 7, wherein the liquid as it passes from the top of one confined space to the bottom of another confined space outside the first named confined spaced is passed between two surfaces with gradually decreasing velocity as the liquid descends.

VIRGIL EHLE.